United States Patent Office 2,768,997
Patented Oct. 30, 1956

2,768,997

PHOSPHORUS-CONTAINING POLYPEPTIDES

Wilson A. Reeves and John D. Guthrie, New Orleans, La., assignors to the United States of America as represented by the Secretary of Agriculture No Drawing. Application November 18, 1953, Serial No. 393,022

7 Claims. (Cl. 260—121)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to chemical treatments of polypeptides and proteins which can be dispersed or dissolved in an aqueous medium. More particularly the invention provides processes of chemically modifying such polypeptides and proteins and/or improving their coagulation and precipitation from aqueous dispersions or solutions.

This application is a continuation in part of our copending applications, Serial Nos. 283,743, now Patent No. 2,668,096, and 283,744, filed April 22, 1952, Serial No. 348,137, filed April 10, 1953, and Serial Numbers 378,435 and 378,437, filed September 3, 1953.

Many important processes of producing and using vegetable, animal, or synthetic polypeptides or proteins involve dispersing these materials in a neutral, acidic or basic aqueous medium and isolating them by precipitation, coagulation and mechanical separation. It is often difficult to produce such polypeptides or proteins in a high yield in a reasonable time because much of the precipitated material remains dispersed in a turbid supernatant liquor. It is also often difficult to obtain the products as dry light colored materials because they normally have a relatively dark color and/or become darker in color while they are being isolated and dried. In addition, the materials produced from aqueous dispersion are generally characterized by a relatively low stability.

An object of the present invention is to provide relatively light colored heat resistant proteins and polypeptides in which phophorus atoms of polyfunctional phosphorus groups are attached to nitrogen atoms. Another object is to provide a process for the production of such heat resistant polypeptides and proteins. A further object is to provide processes of increasing the proportion of crosslinking between the proteins or polypeptide chains. A further object is to provide aqueous dispersion mediums in which the polypeptide or protein precipitation nad coagulation, at the isoelectric point, is more rapid and complete. A still further object is to provide an improved process of precipitating and coagulating the polypeptides or proteins dispersed in aqueous mediums.

In general the process of this invention comprises reacting a polypeptide or protein dispersed in an aqueous medium with at least one compound of the group, tetrakis-(hydroxymethyl) phosphonium chloride, tris(hydroxymethyl) phosphine oxide, and phosphorus linked methylol group containing derivatives thereof, that is, derivatives of tetrakis(hydroxymethyl) phosphonium chloride or tris(hydroxymethyl) phosphine oxide which contain at least one methylol group attached to a phosphorus atom.

Hereinafter the compounds tetrakis(hydroxymethyl) phosphonium chloride and tris(hydroxymethyl) phosphine oxide are referred to by their initials THPC and THPO, respectively. The term "phosphorus compounds" will be used exclusively to refer to at least one compound of the group consisting of, THPC, THPO and phosphorus linked methylol containing derivatives thereof. The phosphorus linked methylol group containing derivatives are the products of reacting THPC, THPO, or a mixture thereof, with at least one other compound to form a product containing at least two $PCH_2OH$ groups in which pentavalent phosphorus atoms are members of phosphorus containing radicals of the group, trimethylene phosphine oxide, $(-CH_2)_3PO$, and tetramethylene phosphonium chloride, $(-CH_2)_4PCl$.

Polypeptides and proteins react with the phosphorus compounds to produce chemically modified substances in which phosphorus atoms in radicals of the group, trimethylene phosphine oxide and tetramethylene phosphonium chloride radicals, as described above, are attached to the trivalent nitrogen atoms of the polypeptides or proteins by radicals that form structures of the group $NCH_2P$ and $NCH_2OCH_2P$.

Hereinafter such chemically modified polypeptides and proteins will be referred to by the term "phosphorus modified polypeptides and proteins."

Polypeptides and proteins suitable for use in the present invention comprise aqueous medium dispersible natural proteins, or natural or synthetic polypeptides in which each of the reoccurring structural units contains at least one structure of the group $CONH$ and $CONCH_2OH$. Illustrative examples of suitable starting materials include proteins of vegetable origin such as those derived from peanuts, soybeans, corn, cottonseed, flax, and wheat; proteins of animal origin such as casein and other milk proteins, egg albumin, solubilized keratin from feathers and wool, solubilized silk proteins, the albumins and globulins obtained from blood; partly-degraded proteins such as gelatin, special partly-hydrolyzed proteins of animal and vegetable origin; diamido and diaminated protein derivatives; proteins possessing enzymatic activity such as pepsin, trypsin, and papain; protamines such as clupein and salamin; polypeptides of synthetic origin, such as poly-hexamethylene adipamide) and synthetic polypeptides containing residues of lysine, serine, and tryptophane; and the aqueous medium dispersible products of reacting such polypeptides with one or more aldehydes. The reaction of the polypeptides with an aldehyde can be conducted prior to, concurrently with, or subsequent to the reaction of the polypeptide with the phosphorus compounds.

Illustrative examples of suitable phosphorus compounds include: THPC, THPO, mixtures thereof, and the phosphorus linked methylol group containing derivatives produced by reacting them with: melamine, methylol melamine, dihydroxyethylamine, cetylamine, ethylenimine, phenol, naphthol, terephthalyl dichloride, maleic anhydride, and the like. The reaction by which a phosphorus compound derivative is formed can be conducted prior to, concurrently with, or subsequent to the reaction of the phosphorus compound with the polypeptide.

Preferred phosphorus compounds for employment in the present process consist of mixtures of THPC and THPO predominating in THPC. Such mixtures can be prepared by mixing the individual compounds or by reacting THPC with a basic compound until a minor proportion is converted to THPO. The conversion of the THPC to THPO can be accomplished in situ concurrently with the reaction of the mixture of THPC and THPO with a polypeptide or protein. Illustrative examples of basic compounds with which THPC can be reacted to produce a mixture of THPC and THPO include: primary and secondary amines, such as cetyl amine, diethanol amine, and the like, which also react with the phosphorus linked methylol groups to concurrently form modified phosphorus compounds; tertiary amines such as triethanolamine; and inorganic bases, such water soluble salts of carbonic acid, and the like.

Hereinafter the term "parts" is used exclusively to refer to parts by weight.

The polypeptides or proteins can be reacted with the phosphorus compounds under a wide variety of conditions. The reaction temperature can range from about 0° C. to a temperature at which thermal decomposition of the polypeptide or protein occurs. Temperatures of from about 20 to 80° C. are preferred. The phosphorus compounds can be diluted with a water miscible unreactive liquid, or can be employed in undiluted form, aqueous solutions of the phosphorus compounds being preferred. Although the proportions of the phosphorus compounds and the polypeptides or proteins can be varied as desired to obtain the desired extent of conversion of the latter materials, the use of from about 0.02 to 0.20 part of phosphorus compound per part of polypeptide or protein (i. e., 1 to 20% by weight) is preferred. The reaction can be conducted as a continuous or batchwise process under pressures above, below or equal to normal atmospheric pressure. A reaction medium pH of from about 3 to 7 is preferred, although the pH may vary over a range of about 1 to 10.

The reactions can be conducted in the presence or absence of minor amounts of acidic or basic substances as catalysts. In general the reaction between THPC and polypeptides or proteins proceeds rapidly and extensively in the absence of a catalyst, but in some cases a catalytic amount of an acidic or a basic substance appreciably enhances the rate of reaction of THPO or mixtures rich in THPO.

The extent of the increase both in phosphorus content and in the proportion of cross linkages in a material treated in accordance with this invention can suitably be controlled by varying the proportion and character of the phosphorus compound, the temperature, and the time of reaction.

The phosphorus-modified polypeptides or proteins produced by this invention can be isolated by precipitating the products from the reaction mixtures in which they were produced, by conventional precipitation methods. For example, such phosphorus-modified polypeptides or proteins can be precipitated by adjusting the pH of the mediums to the isoelectric point, mechanically separating the precipitate and washing it with water. Such polypeptides or proteins are useful, per se, in the textile fiber spinning process and the like. Purer products can readily be produced by numerous conventional procedures for purifying proteinaceous materials. A particularly suitable purification procedure comprises dialyzing the reaction medium, freezing it on the walls of suitable vessels, and subjecting the frozen material to a vacuum of 0.500 to 0.030 millimeter of mercury, so as to cause the water to leave the frozen mixture by sublimation. In general, the phosphorus modified products obtained by the present process can be used wherever the unmodified polypeptide or protein can be used.

The processes of enhancing the completeness and rapidity of the precipitation and coagulation from dispersions in aqueous mediums provided by this invention comprise incorporating a small amount of the previously described phosphorus compound in an aqueous polypeptide or protein dispersion medium having a pH of from about 1 to 10. THPC is preferred. The incorporation can precede or follow the dispersion and/or the precipitation of the polypeptide or protein; but preferably follows the dispersion and precedes the precipitation. Novel aqueous dispersion mediums produced by such an incorporation are mediums in which polypeptides or proteins can be stored under the usual dispersion storage conditions, and in which the precipitation and coagulation of the polypeptide or protein is materially improved both in rate and extent. As little as 0.01 part of phosphorus compound per part of polypeptide or protein provides an appreciable improvement, and the proportion of the phosphorus compound can be as high as is desired. However, more than about 0.2 part per part of polypeptide or protein provides but little additional improvement. Aqueous dispersion mediums having a pH of from about 3.0 to 8.5, and containing from about .01 to .05 part of THPC per part of polypeptide or protein to be dispersed in the medium, are preferred.

Phosphorus-modified polypeptides or proteins containing HOCH$_2$P groups can be increased in nitrogen content and extent of crosslinking by reacting them with ammonia. The reaction of polymeric compounds containing HOCH$_2$P groups with ammonia is described in greater detail in our co-pending application Serial No. 393,021, filed of even date.

The following examples are illustrative of details of the invention:

Example 1

About 5 parts of chicken egg white were mixed with a solution of 0.5 part of THPC in about 3 parts of water. A clear gel formed in about 30 minutes. The gel was washed with water and dried at 110° C., producing a white polymer containing 1.52 phosphorus.

About 5 parts of the same egg white was coagulated with 95% ethanol, washed with water and dried at 75° C. The so treated egg white had a pronounced yellow color and contained only about 0.10% phosphorus.

Example 2

About 10 parts of peanut protein was dispersed in about 200 parts of dilute aqueous hydrochloric acid at a pH of 3.

One portion, 60 parts, of the dispersion was stored at 8° C. for 16 hours. After the storage the protein was precipitated by adding enough triethanol amine to raise the pH to about 7. The particle size of the precipitate was small and the supernatant liquor was turbid.

A second portion of the dispersion, 120 parts, was mixed with a solution of 5 grams of THPC in about 5 parts of water. The mixture was stored at 8° C. for 16 hours. After the storage the protein was precipitated by adding enough triethanol amine to raise the pH to about 7. The particle size of the precipitate was very large by comparison and the supernatant liquor was clear.

The proteins obtained from both portions of the dispersion were water washed and dried at 100° C. The protein obtained from the first portion was dark colored and contained about 0.2% phosphorus. The protein obtained from the second (THPC treated) portion was very light in color by comparison and contained 0.67% phosphorus.

Example 3

About 20 parts of peanut protein was dispersed in about 300 parts of dilute aqueous hydrochloric acid at a pH of from about 2½ to 3.

Half of the dispersion was precipitated by the addition of enough triethanol amine to raise the pH to 6. The precipitate consisted of small gray particles which did not coagulate, but remained dispersed in a very turbid supernatant liquid. The precipitate was centrifugally isolated, water washed and dried at from 70 to 100° C. for 6 hours. The dried precipitate was dark colored and contained 0.21 percent phosphorus. When the precipitate was ground in a mortar and mixed with water, it swelled appreciably.

The other half of the dispersion was mixed with a solution of 2 parts of THPC in about 7 parts of water, warmed to about 70° C., and cooled to room temperature. The protein was precipitated at room temperature by adding enough triethanol amine to raise the pH to 6. The precipitate rapidly coagulated into substantially colorless particles (up to about 3 mm. in diameter) which could easily be removed from the clear supernatant liquid with tweezers. The precipitate was water washed and dried at from 70 to 100° C. for 6 hours. The dried precipitate was substantially white and contained 1.45% phosphorus. When the precipitate was ground in a mortar and mixed with distilled water it did not swell appreciably.

We claim:

1. A substance selected from the group consisting of phosphorus-modified polypeptides and proteins containing reoccurring structural units in which each of said units contains at least one phosphorus atom connected to a trivalent nitrogen atom by a structure from the group consisting of —$CH_2$— and —$CH_2OCH_2$—, said substance having been produced by reacting, in an aqueous dispersion, a material from the group consisting of aqueous dispersible polypeptides and aqueous dispersible proteins which contain reoccurring structural units, each of said reoccurring structural units containing at least one structure from the group consisting of $$-\overset{|}{\text{C}}\text{ONH} \text{ and } -\overset{|}{\text{C}}\text{O}\overset{|}{\text{N}}\text{CH}_2\text{OH}$$

with a phosphorus compound selected from the group consisting of tetrakis(hydroxmethyl) phosphonium chloride, tris(hydroxymethyl) phosphine oxide, and mixtures of tetrakis(hydroxymethyl) phosphonium chloride and tris(hydroxymethyl) phosphine oxide.

2. A method for producing a substance from the group consisting of phosphorus-modified polypeptides and phosphorus-modified proteins which comprises reacting in an aqueous dispersion a material from the group consisting of aqueous dispersible polypeptides and aqueous dispersible proteins which contain reoccurring structural units, each of said reoccurring structural units containing at least one structure from the group consisting of $$-\overset{|}{\text{C}}\text{ONH} \text{ and } -\overset{|}{\text{C}}\text{O}\overset{|}{\text{N}}\text{CH}_2\text{OH}$$

with a phosphorus compound selected from the group consisting of tetrakis(hydroxymethyl) phosphonium chloride, tris(hydroxymethyl) phosphine oxide, and mixtures of tetrakis(hydroxymethyl) phosphonium chloride and tris(hydroxymethyl) phosphine oxide.

3. A method for producing a substance from the group consisting of phosphorus-modified polypeptides and phosphorus-modified proteins which comprises reacting, in an aqueous dispersion having a pH of from 1 to 10, one part of a material from the group consisting of aqueous dispersible polypeptides and aqueous dispersible proteins which contain reoccurring structural units, each of said structural units containing at least one structure from the group consisting of $$-\overset{|}{\text{C}}\text{ONH} \text{ and } -\overset{|}{\text{C}}\text{O}\overset{|}{\text{N}}\text{CH}_2\text{OH}$$

with from about 0.01 to 0.5 parts of a phosphorus compound selected from the group consisting of tetrakis(hydroxymethyl) phosphonium chloride, tris(hydroxymethyl) phosphine oxide, and mixtures of tetrakis(hydroxymethyl) phosphonium chloride and tris (hydroxymethyl) phosphine oxide.

4. Process of claim 2 in which the material is reacted with a mixture of tetrakis(hydroxymethyl) phosphonium chloride and tris(hydroxymethyl) phosphine oxide.

5. A process comprising reacting chicken egg white protein with tetrakis(hydroxymethyl) phosphonium chloride.

6. A process comprising reacting peanut protein dispersed in an aqueous medium with tetrakis(hydroxymethyl) phosphonium chloride.

7. A process of improving the precipitation and coagulation of a material selected from the group consisting of polypeptides and proteins dispersed in an acidic aqueous dispersion medium, comprising, incorporating a minor amount of tetrakis(hydroxymethyl) phosphonium chloride in said dispersion medium prior to precipitating said material.

References Cited in the file of this patent

UNITED STATES PATENTS

| | | |
|---|---|---|
| 750,945 | Busch | Feb. 2, 1904 |
| 751,428 | Busch | Feb. 2, 1904 |
| 2,377,624 | Gordon | June 5, 1945 |
| 2,606,902 | Parker et al. | Aug. 12, 1952 |
| 2,668,096 | Reeves et al. | Feb. 2, 1954 |